Oct. 30, 1928.

J. M. BROWN

CLUTCH DEVICE

Original Filed Jan. 11, 1923    3 Sheets-Sheet 1

1,689,857

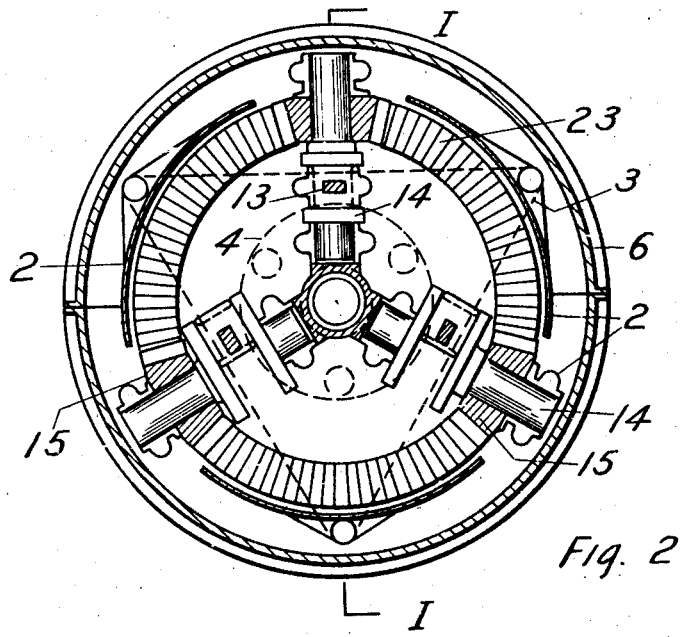
Fig. 2
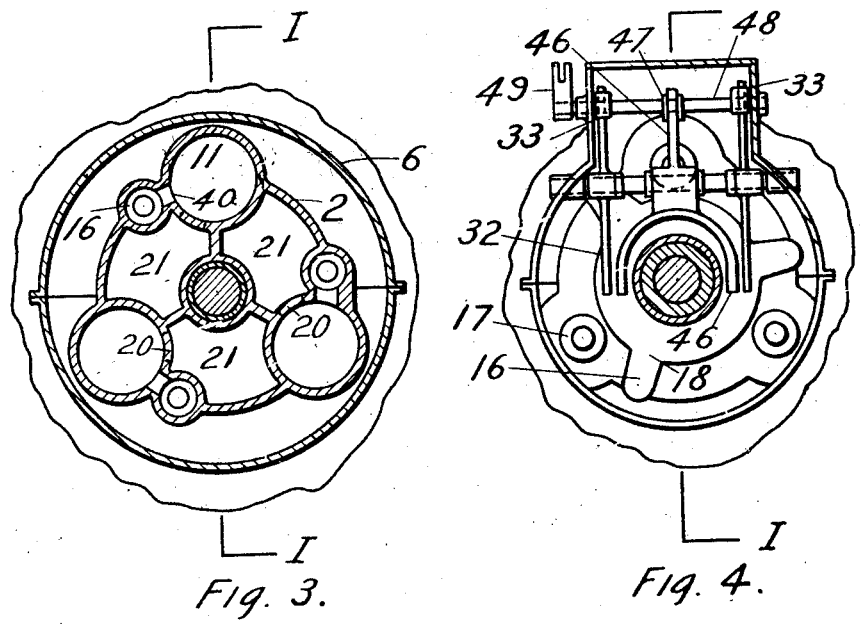
Fig. 3.
Fig. 4.

Oct. 30, 1928.

J. M. BROWN

CLUTCH DEVICE

Original Filed Jan. 11, 1923   3 Sheets-Sheet 3

1,689,857

INVENTOR
James M. Brown
BY
ATTORNEY

Patented Oct. 30, 1928.

1,689,857

UNITED STATES PATENT OFFICE.

JAMES M. BROWN, OF PITTSBURGH, PENNSYLVANIA; JANE D. BROWN ADMINISTRATRIX OF SAID JAMES M. BROWN, DECEASED.

CLUTCH DEVICE.

Application filed January 11, 1923, Serial No. 611,954. Renewed March 21, 1928.

My invention relates to clutch devices and particularly to fluid operated clutches for automotive vehicles.

One object of my invention is to provide a clutch that shall be adapted to transmit the entire driving torque irrespective of the relative speeds of the driving and driven members of the clutch.

Another object of my invention is to provide a clutch of the above indicated character that shall automatically release under predetermined conditions.

Another object of my invention is to provide a clutch of the above indicated character that shall be capable of transmitting the entire driving torque in such manner that the relative speeds of the driving and the driven elements will be definite and completely under the control of the operator.

Another object of my invention is to provide a clutch of the fluid-controlled type that shall have perfect rotating balance under all conditions of operation.

Another object of my invention is to provide a clutch device, of the above indicated character, that shall have means for precluding rotation of the device in a reverse direction from that of the driving torque.

A further object of my invention is to provide a clutch, of the above indicated character, that shall be compact and readily insertable in an automotive vehicle.

In practicing my invention, I provide a driven shaft and a driving member mounted thereon. A piston and a cylinder are carried by the driving member and they are operatively connected to the driven member by gears. A chamber is provided with suitable relief and control valves for controlling the pressure therein.

The chamber is operatively connected to the cylinder under certain conditions. A brake is provided which is controlled by the same lever that controls the valves and means is also provided for preventing reversing of the device. With this arrangement of cylinders, a perfectly balanced device is obtained under all conditions of operation.

In the accompanying drawings—

Fig. 2 is a sectional view of the clutch taken along the line II—II of Fig. 1;

Fig. 3 is a sectional view of the clutch taken along the line III—III of Fig. 1;

Fig. 4 is a sectional view of the clutch taken along the line IV—IV of Fig. 1;

Fig. 5 is a sectional view of the clutch taken along the line V—V of Fig. 1;

Figure 1:
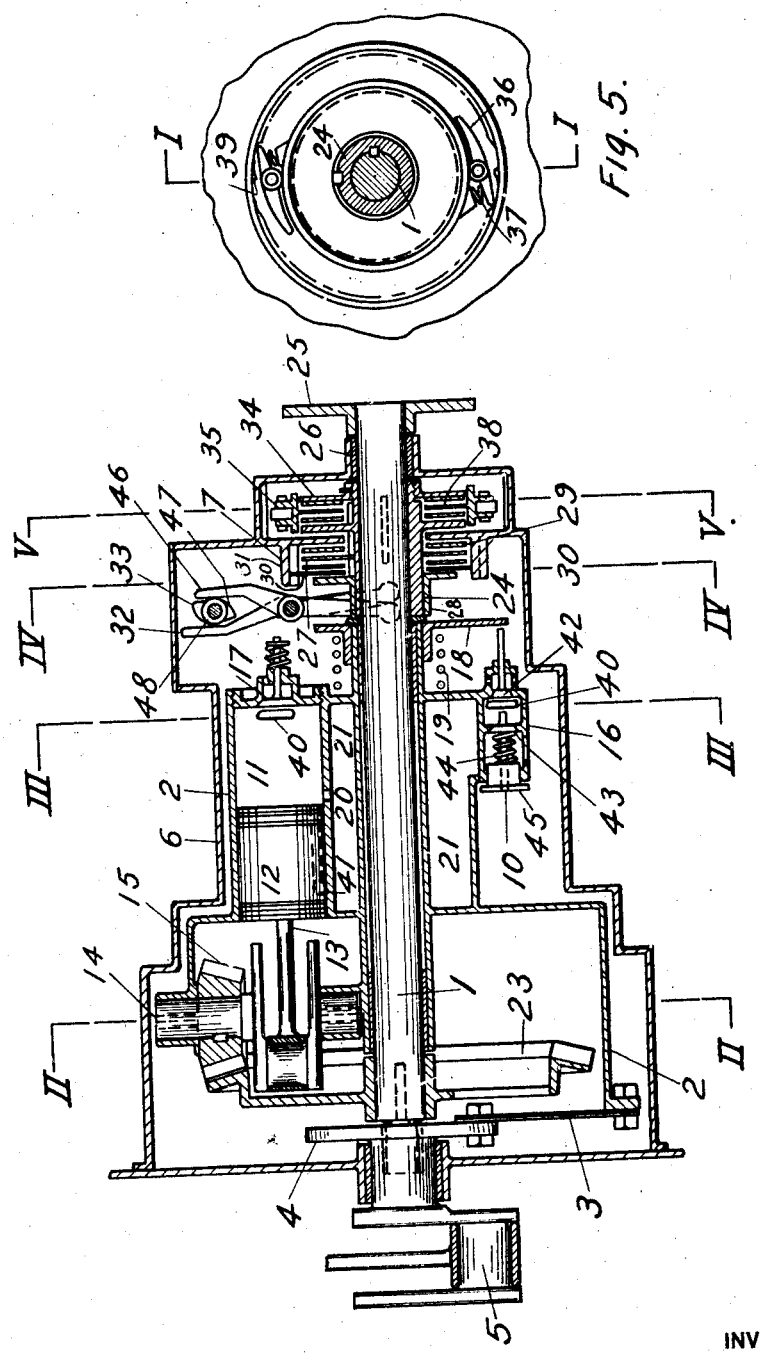
Figure 1 is a longitudinal sectional view of the clutch device embodying my invention.

A clutch embodying my invention comprises, in general, a driven shaft 1, a driving element 2 which is mounted on the shaft 1 and is in turn driven through a flexible coupling 3 from a flange 4 which is actuated by the crank 5 of a prime mover.

The driving element 2 is provided with three symmetrically disposed cylinders 11 which are disposed parallel with respect to the shaft 1, and in which pistons 12 having connecting rods 13 operate. Crank shafts 14 are provided in the driving element or member 2 and severally carry a bevel pinion 15 which engages a bevel gear wheel 23 that is fixedly mounted on the shaft 1.

The driving element 2 is so shaped as to form a pressure chamber 21 having a valve 16 therein. A valve 17 is disposed in the inner end of each cylinder 11.

A control flange 18 which is restrained in one position by a spring 19 is slidably mounted on the cylindrical portion of the driving member 2 and is adapted to be actuated by an operating lever 46 as hereinafter set forth.

The cylinders 11 are provided with ports 20 which are so placed that the cylinders 11 communicate with the pressure chamber 21 under certain conditions, and the pistons 12 are provided with ports 41 which register with the ports 20, under predetermined conditions. That is, compressed air will flow into the cylinders 11 from the chamber 21 when the piston moves to the position shown. The fluid in the cylinders 11 is compressed on the inward stroke of the pistons 12 until the ports 20 and 41 register, then the compressed air is exhausted into the chamber 21 to be used on the next outward stroke of the pistons.

The valves 17 are so adjusted that they open when the pistons move outwardly to admit air at atmospheric pressure before the compressed air is admitted through the ports 20.

The valve 16 is provided with two parts 42 and 43, the first of which is actuated by the flange 18 and the second of which is held closed by a spring 44 which is so adjusted that it opens only when the pressure in the cylinder 11 exceeds a predetermined value. The second part 43 is also opened, upon further movement of the flange 18. The valves 16 are connected to the cylinders 11 through ports 40. A screw 45 is provided for adjusting the setting of the portion 43 of the valves 16.

One end of the shaft 1 is adapted to turn freely in the flange 4 and the other end is supported by a bearing 26 in the housing or frame 6 of the clutch device. A flange 25 is mounted on the shaft 1 as is also one element of a braking device 7.

The braking device 7 consists of a plate holder 24, that is keyed to the shaft 1, and plates 27 that are mounted on and longitudinally but non-rotatively movable on the member 24. A pressure plate 28, and intermediate plates 29 are also mounted on the member 24 and stationary plates 30 are mounted on and are longitudinally but non-rotatively movable in a frame 31. The plates are compressed by a lever 32 which is adapted to be actuated by a cam 33 that is mounted on a shaft 48 upon which is also mounted a cam 47 for co-operating with the lever 46 and a crank 49 for actuating the shaft 48.

The non-reversing means consists of the plate holder 24, plates 27 and 29, as in the brake, a plate 38, a pressure plate 34 and a locking ring 35 to which are fixed dogs 36 which are spring pressed by springs 37 into engagement with notches 39 in the frame or housing.

When torque is furnished by the crank 5 of the prime mover, it is transmitted through the flexible driving means 3 to the driving element 2. Since the gears 15 and 23 are continuously engaged, the movement of the member 2 about the shaft 1 causes the several bevel pinions 15 to turn as it revolves and in so doing it will cause the cranks 14 to turn. This will reciprocate the pistons 12 in the cylinders 11.

On the outward stroke of the pistons 12, air is drawn in through the valves 17, which air is compressed on the return stroke of the pistons until the ports 20 and 41 register, then the compressed air is conveyed to the auxiliary pressure chamber 21. Should the pressure in the cylinders 11 become too high, the portion 43 of the valves 16 will open to relieve the pressure and in all intents and purposes disconnects the clutch action.

It will be readily seen that the amount of movement of the pistons 12 and the speed of rotation of the pinion 15 control the relative speed between the members 1 and 2. Therefore, if the valves 16 are closed so completely as not to permit movement of the pistons, the speed of the elements 1 and 2 will be the same. The building up of the pressure in the chamber 21 and in the cylinders 11 may be delayed or prevented by the manipulation of the two portions of the valves 16 to partial or full open position.

When it is desired to stop the clutch or cause a difference in speed between the elements 1 and 2, the crank 49 is turned causing the shaft 48 to turn. This turns the cam 47 into engagement with the lever 46 causing the flange 18 to move into such position as to open the portion 42 of valve 16, and this causes leakage of air. The leakage causes a difference in speed between the elements 1 and 2 and also a greater number of strokes of the pistons 12 in order to maintain the desired pressure in the cylinders 11 and the chamber 21. A further movement of the crank 49 will open the portion 43 of the valve 16 which reduces the pressure in the cylinders 11 and the chamber 21 and, consequently, permits the flange 4 to rotate freely.

A further movement of the crank 49 causes the cam 33 to move against the lever 32 which pressure is transmitted to the member 28 to cause the plates of the brake to be compressed and a braking action to be exerted on the shaft 1.

Since the non-reversing plates 38 are clamped permanently by the clamping plate 34, when the device is at rest the dogs 36 engage notches 39 to prevent reversal. However, when the shaft 1 rotates in the proper direction, the centrifugal forces exerted on the dogs 36 cause disengagement from the notches 39. The dogs 36 are fastened to the shaft 1 through plates 34, 35 and 38 to prevent injury by reason of abnormal shocks.

Figure 7:
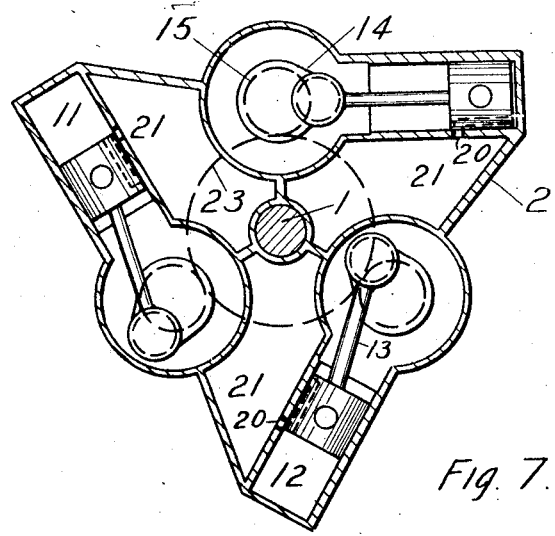
Fig. 7 is a diagrammatic view of a still further modified form of clutch embodying my invention.
Figure 6:
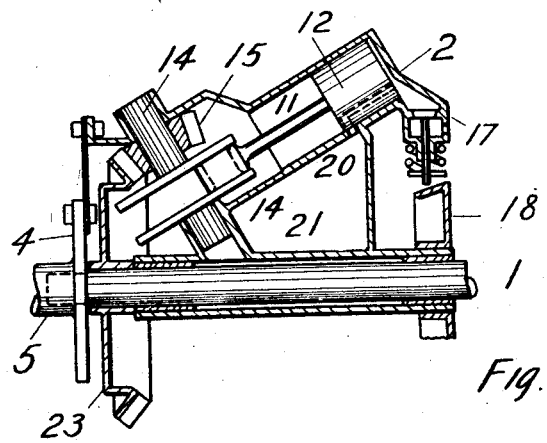
Fig. 6 is a longitudinal sectional view of a portion of a modified form of clutch embodying my invention.

In Fig. 6 of the drawings, I have illustrated the cylinders 12 disposed at an angle with respect to the shaft 1 to shorten the device but still symmetrically located to ensure accurate balance under all conditions of operation. In Fig. 7, the pistons and cylinders 12 and 11 are disposed around the shaft with their axis in planes perpendicular to the shaft. These also are so symmetrically arranged as to produce balanced operation. With the arrangement shown in Fig. 7, the overall length of the device may be greatly shortened.

While I have illustrated several of the preferred forms of my invention, it is not limited to the specific structure illustrated but may be variously modified without departing from the spirit and scope of the invention, as set forth in the appended claims.

I claim as my invention:—

1. In a clutch device, the combination with a driving and a driven clutch member, of co-operating gear members for connecting the driving and driven clutch members together; one of the gear members being directly connected to one of the clutch members, means for rotatably connecting the other gear member to the other clutch member, a cylinder, a piston connected to the rotatably connected gear member for controlling the operation of said rotatably connected gear member and means whereby during part of the intake stroke of the piston the cylinder is supplied with compressed air.

2. In a clutch device, the combination with a driving and a driven clutch member, of cooperating gear members for connecting the clutch members together, means for fixedly mounting one of the gear members on the driven member, a cylinder mounted on the driving clutch member, a piston therefor, means for connecting the piston to the other gear member, and means for causing compressed air to be supplied to the cylinder during a part of the stroke of the piston.

3. In a clutch device, the combination with a driving and a driven clutch member, of a cylinder and a piston mounted on the clutch members for connecting the said members, a pressure chamber, means whereby on the exhaust stroke the fluid in the cylinder is exhausted into the chamber under predetermined conditions, and means whereby on the intake stroke the pressure chamber is connected to the cylinder during a part of the stroke of the piston.

4. In a clutch device, the combination with a driving and a driven clutch member, of a cylinder and a piston mounted on the clutch members for connecting the said members, a pressure chamber, and means whereby the cylinder is operatively connected to the pressure chamber under predetermined conditions during the exhaust stroke and to the pressure chamber during the intake stroke.

5. In a clutch device, the combination with a driving and a driven clutch member, of a cylinder and a piston mounted on one of the clutch members for connecting the clutch members together, a pressure chamber communicating with the cylinder during parts of the intake and exhaust strokes, and means for controlling the pressure in the chamber.

6. In a clutch device, the combination with a driving and a driven clutch member, of a cylinder and a piston mounted on one of the clutch members for connecting the clutch members together, a pressure chamber communicating with the cylinder during both strokes of the piston and means for normally controlling the pressure in the chamber.

7. In a clutch device, the combination with a driving and a driven clutch member, of a cylinder and a piston for connecting the clutch members, and means whereby during part of the intake stroke of the piston the cylinder is open to the atmosphere and during another part of the intake stroke of the piston the cylinder is supplied with compressed air.

In testimony whereof, I have hereunto subscribed my name this 10th day of January, 1923.

JAMES M. BROWN.